US006801972B2

United States Patent
Stuber et al.

(10) Patent No.: US 6,801,972 B2
(45) Date of Patent: Oct. 5, 2004

(54) INTERFACE SHUTDOWN MODE FOR A DATA BUS SLAVE

(75) Inventors: Russell B. Stuber, Boulder, CO (US); Randall S. Miller, Longmont, CO (US)

(73) Assignee: LSI Logic Corporation, Milpitas, CA (US)

( * ) Notice: Subject to any disclaimer, the term of this patent is extended or adjusted under 35 U.S.C. 154(b) by 454 days.

(21) Appl. No.: 10/077,453

(22) Filed: Feb. 15, 2002

(65) Prior Publication Data

US 2003/0158984 A1 Aug. 21, 2003

(51) Int. Cl.[7] .......................... G06F 13/38; G06F 13/14
(52) U.S. Cl. ...................... 710/107; 710/110; 710/112; 710/57; 710/15
(58) Field of Search ................................. 710/107, 108, 710/110, 112, 15, 18, 19, 39, 57, 306, 310

(56) References Cited

U.S. PATENT DOCUMENTS

| | | | | |
|---|---|---|---|---|
| 5,524,263 A | * | 6/1996 | Griffth et al. | 712/23 |
| 5,535,340 A | * | 7/1996 | Bell et al. | 710/112 |
| 5,961,621 A | * | 10/1999 | Wu et al. | 710/107 |
| 6,092,141 A | * | 7/2000 | Lange | 710/310 |
| 6,216,190 B1 | * | 4/2001 | Chin et al. | 710/311 |
| 6,697,904 B1 | * | 2/2004 | Bennett | 710/309 |
| 2003/0065844 A1 | * | 4/2003 | Lester et al. | 710/107 |

OTHER PUBLICATIONS

"AMBA™ Specification (Rev. 2.0)", ARM Limited, Cambridge, England, pp. ii–vi and 3-1–3-58 (May 13, 1999).

* cited by examiner

*Primary Examiner*—Sumati Lefkowitz
*Assistant Examiner*—Dale Hall
(74) *Attorney, Agent, or Firm*—Westman, Champlin & Kelly

(57) ABSTRACT

A slave device receives commands from a master device for execution on a first-in, first-out basis. A status register is responsive to a queue of commands to provide a COMMAND_STATUS_FULL signal when the queue is full of commands. A configuration register provides a SHUT_DOWN signal identifying a shutdown status of the slave device. A bus control is responsive to the command and to either the COMMAND_STATUS_FULL or SHUT_DOWN signal to idle the data bus and deny the requesting master device access to the data bus if the command is for a non-locked transfer, or to stall the data bus if the command is for a locked transfer request.

19 Claims, 2 Drawing Sheets

INTERFACE SHUTDOWN MODE FOR A DATA BUS SLAVE

FIELD OF THE INVENTION

This invention relates to data buses, and particularly to controls for slave devices on data buses used in integrated circuit chips and the like.

BACKGROUND OF THE INVENTION

Data buses are used in integrated circuits (ICs) to transfer data between points in the IC. Usually, the data bus couples one or more master devices, such as user-controlled microprocessors, to one or more slave devices that control peripheral devices, such as memories or the like. To avoid overlapping data messages that may lead to error in data transmission between the master and slave devices, it is common to employ an arbiter to arbitrate message traffic on the bus. One such bus design is an Advanced High-performance Bus (AHB) from ARM Limited of Cambridge, England. The AHB bus design is a form of an Advanced Microcontroller Bus Architecture (AMBA) bus. The AHB bus provides high performance, high clock frequency transfer between multiple bus master devices and multiple bus slave devices. The AHB bus is particularly useful in integrated circuit chips, including single chip processors, to couple processors to on-chip memories and off-chip external memory interfaces.

In many bus designs, including the AHB bus, if the peripheral device driven by the slave device is or becomes shut down, it is necessary to re-initialize the slave device before it can honor requests from a master device. However, the slave device can not handle requests while it resets or re-initializes. In the past, it was common to operate the slave device to stall the bus for some predetermined time period, and then release the bus for access by the master devices in accordance with the arbiter's protocol. The stall initiated by the resetting slave usually stalled the entire bus system, halting traffic on the bus until the time period expired. If the time period was not long enough to permit the slave device to completely re-initialize, improper decoding of requests by the re-initializing slave device. If the time period was too long, time was lost as the master devices waited the extra time before issuing commands.

SUMMARY OF THE INVENTION

The present invention is directed to monitoring the slave device's behavior to bus transactions so that the slave device can either stall or split transactions, depending on the type of transaction, in the event it is in a shut down or initializing state.

In one embodiment, a slave device receives commands from a master device for execution on a first-in, first-out basis. A status register is responsive to a command queue to provide a COMMAND_STATUS_FULL signal when the command queue is filled. A configuration register is responsive a shut down state (including initializing) of the slave device or its associated peripheral device to provide a SHUT_DOWN signal. A bus control is responsive to the command and to the COMMAND_STATUS_FULL or SHUT_DOWN signal to operate the data bus to a predetermined mode based on the command.

In preferred embodiments, an OR gate is coupled to the status register and the configuration register to provide a COMMAND_QUEUE_FULL signal to the bus control. The bus control is responsive to the COMMAND_QUEUE_FULL signal and the command to idle the data bus and deny the requesting master device access to the data bus if the command is for a non-locked transfer, or to stall the data bus if the command is for a locked transfer request.

DETAILED DESCRIPTION OF THE PREFERRED EMBODIMENTS

Figure 1:
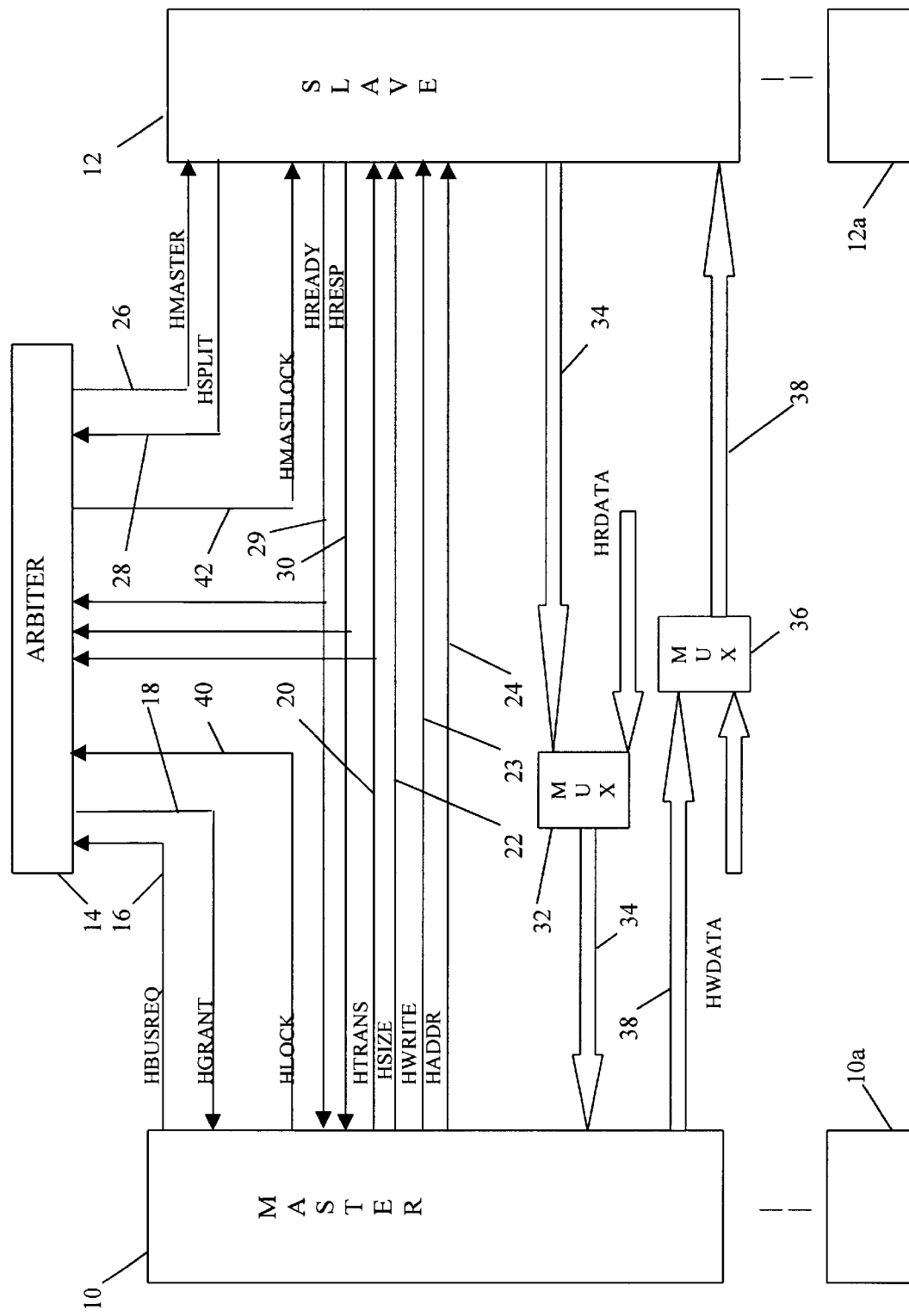
FIG. 1 is a functional block diagram of portions of a bus, illustrating a shutdown control according to the present invention.

FIG. 1 illustrates portions of an Advanced High-performance Bus (AHB) design of an Advanced Microcontroller Bus Architecture (AMBA) bus from ARM Limited of Cambridge, England containing features of the present invention. A more detailed description of the AHB bus design may be found in *AMBA Specification* published by ARM Limited of Cambridge, England (1999), and particularly Chapter 3 thereof (pp. 3-1 to 3-58), incorporated herein by reference. This bus provides high performance, high clock frequency transfer between multiple bus master devices 10, 10a, etc. and multiple bus slave devices 12, 12a, etc., and is particularly useful in microprocessor chips, including single chip processors.

A master device 10 is a device that is capable of initiating a data transfer with a slave device 12 by providing address and control information. Examples of operations requiring data transfer between master and slave devices include read and write operations to read data from, or write data to, a peripheral memory device operated by the slave device. A slave device 12 is a device that responds to a command to perform the data transfer. The slave device ordinarily provides a return indicating the success, failure or waiting status of the data transfer.

In the bus illustrated in FIG. 1, data transfer operations between the master and slave devices are arbitrated by an arbiter 14, which is a device that ensures that only one master device 10 is allowed to initiate data transfers at a given time. The arbiter operates in accordance with an arbitration protocol that establishes a priority among the master devices, such as by an assigned rank or an allocation scheme based on usage.

One feature of the bus illustrated in FIG. 1 is the ability of certain slave devices 12 to initiate a split of a transfer request from a master device 10. More particularly, when a slave device is not ready to respond to the master device command, it may issue a stall or a split. A stall will hold the bus for the transaction with the master device so that no other traffic is permitted. A split will block the master device from the bus and idle the bus so that it becomes available to other master devices. Thus, a stall holds the bus busy, whereas a split releases the bus for use by other master devices. Splits are issued in response to implementation-specific conditions, such as where the slave device decides that the transfer will require a large number of cycles to complete or where the slave device is unable to process multiple transfer requests concurrently.

If the slave device issues a split, the requesting master device is blocked from use of the bus and the bus is idled for use by other master devices. When the slave device becomes ready to handle a request from a master device, it releases the splits so that the previously-split master devices can be granted access to the bus.

Split transfers improve the overall utilization of the bus by separating, or splitting, the operation of the master device 10 providing the address to a slave device 12 from the operation of the slave device. Thus, with a split operation, the slave device can delay a master device from access to the bus until the slave device is ready to respond to the command.

A split initiated by slave device 12 causes arbiter 14 to mask off the master device 10 which issued the command from access to the bus. The split also idles the bus for use by other master devices. When slave device 12 is ready to handle the master device request, it notifies arbiter 14 that it is ready and the arbiter unmasks the affected master device 10 so that the master device can be granted access to the bus in accordance with the arbitration protocol of the arbiter. Upon re-arbitration and re-grant, the master device re-issues the command that had been split to the slave device.

In operation of the data bus system shown in FIG. 1, arbiter 14 is configured to receive an HBUSREQ signal via an individual line 16 from a respective master device 10, indicating that the respective master device 10 seeks access to the data bus. Arbiter 14 responds to the requests in an order established by its protocol, as modified by any split or retry operation, to issue an HGRANT signal via a respective line 18 to one of the requesting master devices. If, for example, there are sixteen master devices, there will be sixteen lines 16 on which each respective master device 10 notifies arbiter 14 that the respective master device desires use of the bus and there will be sixteen lines 18 on which access is granted. The arbiter protocol grants access to one and only one master device at a time.

When access is granted to a master device 10, the address phase commences with the requesting master device 10 sending each slave device 12 an HTRANS signal via bus 20, an HSIZE signal via bus 22, an HWRITE signal via bus 23 and an HADDR signal via bus 24. The HTRANS signal is also sent to arbiter 14. In addition, the master device sends an HLOCK signal to the arbiter. The HWRITE signal is a single bit representing whether the master device is requesting a read or a write operation; the HSIZE signal is a 3-bit code representing the size of the transfer; the HADDR signal is a 32-bit code representing the address of the location in a slave device where data are to be read or written; the HTRANS signal is a 2-bit code identifying the type of transfer (e.g., sequential, non-sequential, idle or busy); and the HLOCK signal is a bit indicating whether or not the master is performing a series of indivisible (locked) transactions.

Arbiter 14 asserts a master identification code, or tag, via bus 26 identifying the master device that is using the bus. This tag is sent to all of the slave devices via bus 26. In the case of a system with sixteen master devices, the master identification code is a 4-bit code representing the individual master device. Arbiter 14 also asserts an HMASTLOCK bit indicating that the transfer is or is not part of a locked transaction.

Each master transaction (HTRANS) on bus 20 generates a response from one of the slave devices 12, namely the slave device containing the address where the data are to be read or written. The response appears on buses 29 and 30 as a 1-bit HREADY signal and a 2-bit HRESP signal. For purposes of the present invention, there are three responses that need to be considered (there are others as more fully described in the aforementioned AMBA Specification) An OKAY response occurs when HRESP is OKAY (HRESP=(0,0) and HREADY is asserted (HREADY=1). A STALL response occurs when HRESP is OKAY and HREADY is de-asserted (HRESP=(0,0) and HREADY=0). A SPLIT response is a two-cycle response that during the first cycle HREADY is SPLIT (HRESP=(1,1)) and HRESP is de-asserted (HREADY=0) and during the second cycle HRESP remains SPLIT and HREADY is asserted (HRESP=(1,1) and HREADY=1).

The OKAY response (HRESP=(0,0) and HREADY=1) indicates that the previous command has been completed. For example, that the write command and data transfer was accepted by the slave device or that read data are available on the HRDATA bus 34. The STALL response (HRESP=(0,0) and HREADY=0) indicates that the slave device is not ready to provide a response. The slave device may hold HREADY low (HREADY=0) as long as it desires, but arbiter 14 cannot permit any bus traffic as long as HREADY is low, and the results of the prior transfer may not be known. The first cycle of the SPLIT response (HRESP=(1,1) and HREADY=0) causes arbiter 14 to mask off the master device from use of the bus, and the second cycle of the SPLIT response (HRESP=(1,1) and HREADY=1) idles the bus for use by other master devices.

Upon receipt of a command from a master device, the slave device records the bus master number in a master ID queue. If the slave device decides it will handle the transaction it issues an OKAY response on HRESP bus 30. If the command is a write command, or if it is a read command and the read data are available on HRDATA bus 34, the slave device also asserts a bit on the HREADY bus 29 (HREADY=1) and the transaction is completed. Otherwise, the slave device de-asserts the HREADY bus 30 (HREADY=0) to STALL the bus. When read data become available on HRDATA bus 34, slave device 12 asserts a bit on HREADY bus 29 and the transaction is completed.

If the slave device decides it is not ready to handle the transaction, it issues a SPLIT response on HREADY bus 30 and HRESP bus 29 to mask the master device from the bus and idle the bus. Later, when the slave device becomes free to accept a command, it asserts a bit on HSPLIT bus 28 to unmask the split master device(s). More particularly, bus 28 comprises the same number of lines as there are master devices 10, with one line dedicated for each master device. When slave device 12 is ready to accept a command, it asserts a bit on each HSPLIT line 28 corresponding to master devices 10 that it had split, thereby unmasking those master devices so that they may access the bus. Arbiter 14 eventually re-arbitrates the previously masked master devices in accordance with its protocol. On re-arbitration, the master device will eventually be granted access to the bus to re-issue the command and retry the transfer.

The basic stages of a split transaction of a read operation are as follows:

1. The master device 10 starts the transfer in an identical way to any other transfer and issues address and control information.
2. If the slave device 12 is able to provide data immediately it may do so. If the slave device decides that it may take a number of cycles to obtain the data or otherwise honor the command, it may give a split response via buses 29 and 30. During every transfer arbiter 14 broadcasts a number, or tag, showing which master device 10 is using the bus. The slave device 12 that can perform the command records the number, to use it to restart the transfer at a later time.

3. The arbiter masks off the split master device and arbitrates the other master devices for use of the bus. The action of the split response allows bus master device handover to occur.
4. When the slave device 12 is ready to complete the transfer, it asserts a bit on the appropriate line of HSPLIT bus 28 to the arbiter 14 to indicate which master device 10 should be re-arbitrated access to the bus.
5. When the bit is asserted on HSPLIT bus 28, arbiter 14 restores the priority of that master device.
6. Eventually, the arbiter will grant the master device use of the bus so it can re-issue the command and re-attempt the transfer. This may not occur immediately if a higher priority master is using the bus.
7. When the transfer eventually takes place, the slave finishes with an OKAY response (HRESP=(0,0) and HREADY=1) via buses 29 and 30.

As shown in FIG. 1, actual transfer of data is performed directly between the slave device 12 and master device 10. A read transfer occurs when the slave device receives the master identification tag via bus 26 for the master device 10 for which it has retrieved data. At that time, the correct master device 10 has been granted access to the bus and the transfer takes place through multiplexer 32 on bus 34 to the correct master device. During the transfer, the slave device 12 issues an OKAY response on buses 29 and 30 notifying the arbiter and master device that the transfer has successfully occurred.

In some cases, the master device 10 may assert an HLOCK signal on bus 40 to indicate to arbiter 14 that the master device is performing several indivisible transfers and that the arbiter must not grant any other master device access to the bus once the locked transfer commences. The arbiter indicates that a current transfer is part of a locked sequence by asserting an HMASTLOCK signal on bus 42 to slave device 12. The slave device responds to the signal on bus 42 to process all locked transfers before any other master device is granted access to the bus.

The problem to which the present invention is directed is shut-down of the peripheral device driven by the slave device. In the AHB bus, some slave devices serve as an interface between the master device and a peripheral device, such as an external memory. Commands are fed by the slave device to the peripheral device, usually through a device controller. If the fed device shuts down, it is necessary to re-initialize the slave device before it can honor requests from a master device after start up of the slave or fed device.

The slave device is not able to handle commands received while it re-initializes. Consequently, prior to the present invention, it was common to operate the slave device to stall the bus if its fed device shuts down. This solution stalled the entire bus system, rendering it unavailable to all users. The present invention is directed to a technique whereby non-locked transfer commands received when the fed device is shut down and during slave device re-initialization are split, rather than stalled.

Figure 2:
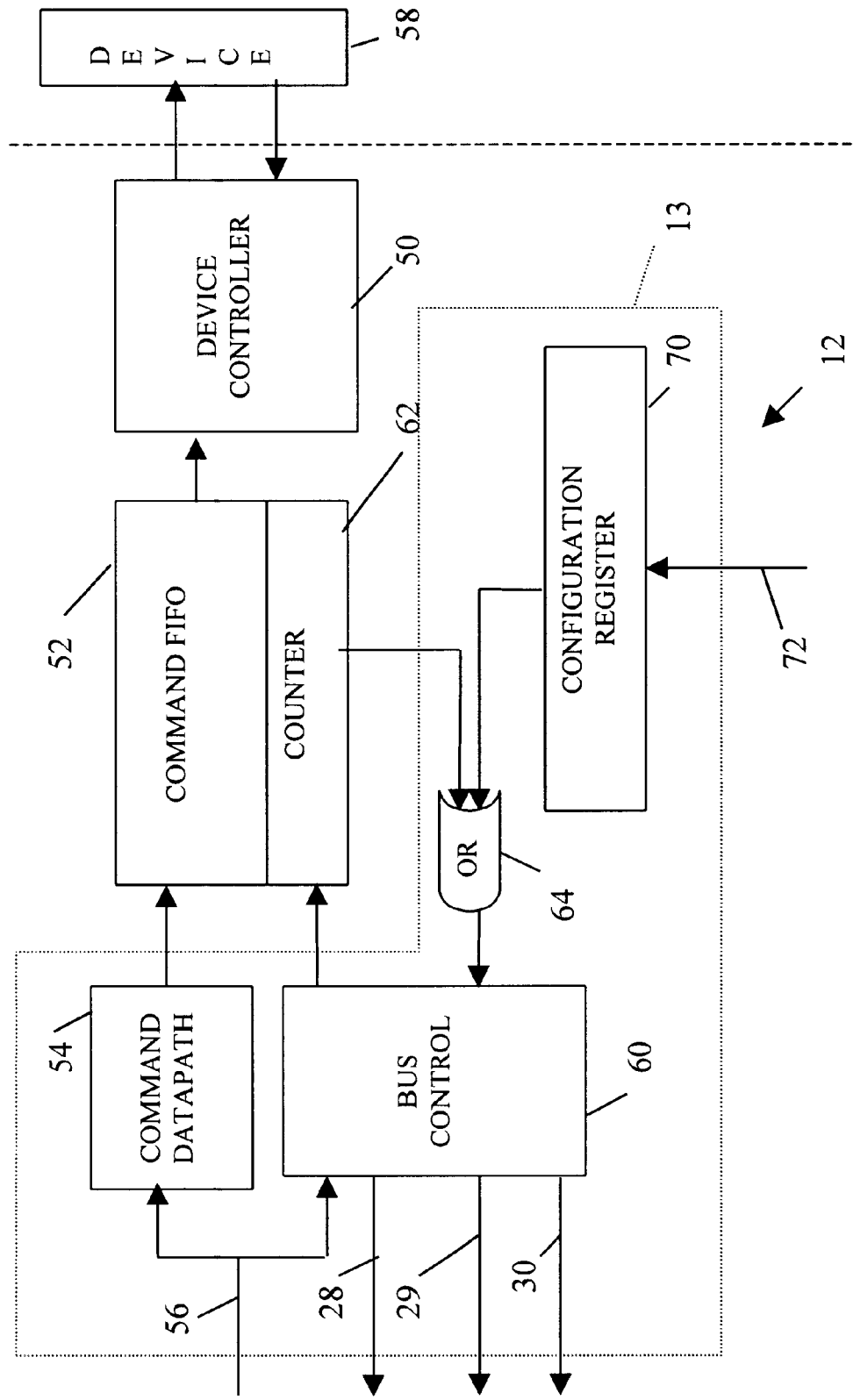
FIG. 2 is a functional block diagram of an input portion of a slave device for the bus illustrated in FIG. 1, together with portions of the device operated by the slave device.

FIG. 2 is a functional block diagram of the input portion of a slave device 12 in accordance with the present invention. The input portion 13 of slave device 12 feeds a command FIFO register 52 that in turn feeds device controller 50. Device controller 50 receives commands from command FIFO 52 and executes them on device 58. Device 58 may be any device controlled by the slave device, such as a memory (on-chip memory, random access memory (RAM), or an external memory, such as a disc drive), a port or a backend of a bridge.

Command datapath 54 receives bus control data (including commands) from bus 56 and feeds the commands to FIFO 52. Bus control 60 responds to the control data from bus 56 to enable writing new commands into FIFO 52 and to manage bus protocol for the slave device. Bus 56 is a representation of the collection of buses 20, 22, 23, 24, 26 and 42 carrying control data for the slave device, including the HADDR address, HMASTER master ID, HMAST-LOCK lock signal, HTRANS transfer type, HSIZE transfer size and HWRITE signal.

FIFO 52 is a register that stores commands for retrieval on a first-in, first-out basis. Counter 62 maintains a count of the number of commands in FIFO 52. The count in counter 62 is incremented with each new command written into command queue 52 and is decremented with each command issued to device controller 50. If counter 62 reaches a count indicating that FIFO 52 is full and cannot accept additional commands, counter 62 asserts a COMMAND_STATUS_FULL bit or flag to a first input of OR gate 64 in slave device 12. Thus, counter 62 serves as a status register that provides a COMMAND_STATUS_FULL bit indicative of the full or not-full status of FIFO 52.

Configuration register 70 is responsive to an INTERFACE_CONFIGURATION bit on line 72 to assert a SHUT_DOWN bit or flag to a second input of OR gate 64. Either the COMMAND_STATUS_FULL bit from counter 62 or the SHUT_DOWN bit from register 70 operates OR gate 64 to supply a COMMAND_QUEUE_FULL bit or flag to bus control 60.

Bus control 60 is responsive to a command on bus 56 and to the state of the COMMAND_QUEUE_FULL flag to supply a response on buses 29 and 30. If the COMMAND_QUEUE_FULL flag is set and the command on bus 56 is a locked transfer command (HMASTLOCK=1 on line 42), bus command 60 will issue a STALL response (HRESP=(0,0) on bus 30 and HREADY=0 on bus 29), thereby stalling the bus as previously described. If the COMMAND_QUEUE_FULL flag is set and the command on bus 56 is an non-locked transfer command (HMASTLOCK=0 on line 42), bus command 60 will issue a two-cycle SPLIT response (HRESP=(1,1) and HREADY=0 followed by HRESP=(1,1) and HREADY=1), thereby splitting the transfer request of the master device 10 issuing the command as previously described.

The INTERFACE_CONFIGURATION bit is set by the slave device when the fed device 58 or device controller 50, goes into a shut down mode. In one form of the invention, configuration register 70 is a bistable multivibrator (flip-flop) that is set by a high INTERFACE_CONFIGURATION bit on line 72 and remains set until it is reset. In some embodiments, register 70 is reset by a low INTERFACE_CONFIGURATION bit on bus 72, which is generated by the slave device upon completion of re-initializing of the slave device. In other embodiments, register 70 is reset upon expiration of a user-defined time period. In either case, the set condition of register 70 forces a high SHUT_DOWN bit to OR gate 64. Consequently, instead of issuing a stall command in response to a shut down or similar occurrence of the peripheral device, the bus controller "sees" a COMMAND_QUEUE_FULL bit from OR gate 64 to issue a split response, thereby masking the master device from access to the bus and idling the bus. Consequently, bus controller 60 receives the high COMMAND_QUEUE_FULL bit from OR gate 64 when either counter 62 is full (a full condition of FIFO 52) or upon shut down of the device under control. Logically, COMMAND_QUEUE_FULL=COMMAND_STATUS_FULL OR SHUT_DOWN.

When the slave device is fully initialized and ready to receive commands, register 70 is cleared (such as by a low INTERFACE_CONFIGURATION bit on line 72 or expiration of a user-defined time period) to force the SHUT_DOWN bit to OR gate 64 low. Assuming the count in counter 62 indicates that FIFO 52 is not full, OR gate 64 supplies a low COMMAND_QUEUE_FULL bit to bus control 60, which in turn asserts a bit on HSPLIT bus 28 to remove the mask from the split master device(s) and permit re-arbitration of the previously-split master devices by the arbiter 14 in accordance with its arbitration protocol.

If the count in counter 62 indicates that FIFO 52 is full, the high COMMAND_STATUS_FULL bit from counter 62 operates OR gate to supply a high COMMAND_QUEUE_FULL bit to bus control 60 so that the bus control will not assert a bit on the HSPLIT bus 28 to remove the split.

The present invention thus provides a technique to force a slave device to issue SPLIT responses in response to non-locked transfer commands from master devices during periods when the device controlled by the slave is shut down and until the slave device is re-initialized and ready to accept commands. As a result, the risk that the slave device might stall the bus upon receipt of an non-locked transfer command during shut down is minimized. The invention is easily implemented into slave devices with a minimum of hardware or software.

One feature of the present invention as applied to the AHB bus architecture is that it employs existing commands and controls of the AHB bus. Consequently, existing commands and controls do not need to be changed to accommodate the present invention. Instead, the inclusion of the configuration register and OR gate permit use of the existing controls to force a SPLIT operation instead of a STALL in the event of a peripheral device shutdown.

Configuration register 70 is set and cleared independently of the arbiter operation via a separate bus 72. This feature allows the slave device to be reset independently from all other devices in the system, and also allows device specific reset to take place in a manner that is transparent to all other components of the system, other than the component being reset and the component that resets it.

While the present invention is described in conjunction with a command FIFO operating a device controller for the peripheral device, in some environments the command FIFO, and its associated counter, might be omitted, in which case the command path directly feeds the device controller. In such cases, the COMMAND_STATUS_FULL bit is issued to OR gate 64 by the device controller based on the queue of commands in the device controller.

Although the present invention has been described with reference to preferred embodiments, workers skilled in the art will recognize that changes may be made in form and detail without departing from the spirit and scope of the invention.

What is claimed is:

1. A slave device for transferring data via a data bus with respective ones of a plurality of master devices wherein an arbiter grants each of the master devices access to the data bus, and wherein data are transferred based on commands from a master device, the slave device comprising:

a status register responsive to a command queue that receives commands from a master device to provide a first signal when the command queue is full of commands;

a configuration register responsive to a predetermined condition comprising a shut down or initialization of the slave device or a device controlled by the slave device to provide a second signal; and a bus control responsive to either the first or second signal and to the command to operate the data bus in a predetermined mode.

2. The apparatus of claim 1, further including:

an OR gate coupled to the status register and the configuration register to provide a third signal to the bus control in response to either the first or second signal, the bus control being responsive to the third signal and the command to operate the data bus to the predetermined mode.

3. The apparatus of claim 2, wherein the predetermined mode is selected from the group consisting of split and stalled modes, and the selection of the mode is based on the command.

4. The apparatus of claim 3, wherein the command is for either a locked transfer or a non-locked transfer, and the bus control is responsive to the command and the third signal to operate the data bus to the split mode if the command is for a non-locked transfer, and to operate the data bus to the stall mode if the command is for a locked transfer.

5. The apparatus of claim 4, wherein the bus control is responsive to a removal of the third signal to provide a fourth signal to the arbiter to re-arbitrate the master devices affected by the split mode.

6. The apparatus of claim 2, wherein the command is for either a locked transfer or a non-locked transfer, and the bus control is responsive to the command and the third signal to operate the data bus to an idle mode and deny the requesting master device access to the data bus if the command is for a non-locked transfer, and to operate the data bus to a stall mode if the command is for a locked transfer.

7. The apparatus of claim 1, wherein the command is of a first or second type, and the bus control is responsive to the command and either the first or second signal to operate the data bus to an idle mode and deny the requesting master device access to the data bus if the command is of a first type, and to operate the data bus to a stall mode if the command is of a second type.

8. The apparatus of claim 1, wherein the predetermined mode is selected from the group consisting of split and stalled modes, and the selection of the mode is based on the command.

9. A process of operating a slave device in a shutdown or initializing condition of the slave device or a device operated by the slave device, where the slave device is coupled to a data bus and responsive to commands from master devices to transfer data between the respective master device and the slave device, wherein the slave device includes a status register responsive to a full condition of a command queue that receives commands for execution to issue a full signal, and a bus control responsive to the full signal and to a command to operate the data bus to a predetermined mode, the process comprising steps of:

a) providing a control signal in response to a shut down or initialization condition; and b) operating the bus control in response to the control signal and the command to operate the data bus to the predetermined mode.

10. The process of claim 9, wherein the command is of a first type that indicates that data are to be transferred intact or a second type that indicates the transfer may be split, the process further including steps of:

c) if the command is a second type,
   c1) idling the data bus, and
   c1) denying the requesting master device access to the data bus, and
d) if the command is a first type, stalling the data bus.

11. The process of claim 10, further including a step of:
e) arbitrating use of the bus to master devices denied access to the data bus in step (c) if the shut down and full conditions cease to exist.

12. In a data bus for transferring data between a slave device and respective ones of a plurality of master devices, wherein the slave device includes transfer apparatus for transferring data to and from the respective master device, a status register that provides a first signal when a command queue that stores commands from master devices for execution is full, and a bus control responsive to the first signal and the command for operating the data bus to a predetermined mode, the improvement comprising:

a configuration register in the slave device responsive to a shutdown or initialization condition of the slave device or a device operated by the slave device to provide a second signal; and the bus control is responsive to the second signal and to the command to operate the data bus in the predetermined mode.

13. The apparatus of claim 12, further including:

an OR gate coupled to the status register and the configuration register to provide a third signal to the bus control in response to either the first or second signal, and the bus control is responsive to the third signal and the command to operate the data bus to the predetermined mode.

14. The apparatus of claim 13, wherein the predetermined mode is selected from the group consisting of split and stalled modes, and the selection of the mode is based on the command.

15. The apparatus of claim 14, wherein the command is for either a locked transfer or a non-locked transfer, and the bus control is responsive to the command and the third signal to operate the data bus to the split mode if the command is for a non-locked transfer, and to operate the data bus to the stall mode if the command is for a locked transfer.

16. The apparatus of claim 13, wherein the command is for either a locked transfer or a non-locked transfer, and the bus control is responsive to the command and the third signal to operate the data bus to an idle mode and deny the requesting master device access to the data bus if the command is for a non-locked transfer, and to operate the data bus to a stall mode if the command is for a locked transfer.

17. The apparatus of claim 16, wherein the bus control is responsive to a removal of the third signal to provide a fourth signal to the arbiter to re-arbitrate the master devices denied access to the data bus.

18. The apparatus of claim 12, wherein the command is for either a locked transfer or a non-locked transfer, and the bus control is responsive to the command and the first or second signal to operate the data bus to an idle mode and deny the requesting master device access to the data bus if the command is for a non-locked transfer, and to operate the data bus to a stall mode if the command is for a locked transfer.

19. The apparatus of claim 12, wherein the predetermined mode is selected from the group consisting of split and stalled modes, and the selection of the mode is based on the command.

* * * * *